United States Patent
Nagao et al.

(10) Patent No.: US 8,614,527 B2
(45) Date of Patent: Dec. 24, 2013

(54) MOTOR AND VEHICLE

(75) Inventors: Toshio Nagao, Kitakyushu (JP); Yuuto Fukuma, Kitakyushu (JP); Takeshi Inoue, Kitakyushu (JP); Tetsuya Itou, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 319 days.

(21) Appl. No.: 12/986,390

(22) Filed: Jan. 7, 2011

(65) Prior Publication Data

US 2011/0169352 A1 Jul. 14, 2011

(30) Foreign Application Priority Data

Jan. 14, 2010 (JP) .................. 2010-005413

(51) Int. Cl.
*H02K 9/02* (2006.01)

(52) U.S. Cl.
USPC ............................................. 310/58; 310/59

(58) Field of Classification Search
USPC ......... 10/52, 54, 58, 59, 60 R, 60 A, 68 R, 89
See application file for complete search history.

(56) References Cited

U.S. PATENT DOCUMENTS

| | | | | |
|---|---|---|---|---|
| 5,006,744 A | * | 4/1991 | Archer et al. | 310/89 |
| 5,678,646 A | * | 10/1997 | Fliege | 180/65.1 |
| 5,682,074 A | * | 10/1997 | Di Pietro et al. | 310/215 |
| 5,932,942 A | * | 8/1999 | Patyk et al. | 310/58 |
| 6,329,731 B1 | * | 12/2001 | Arbanas et al. | 310/52 |
| 6,930,417 B2 | * | 8/2005 | Kaneko et al. | 310/58 |
| 7,839,031 B2 | * | 11/2010 | Tilton et al. | 310/54 |
| 2003/0173839 A1 | | 9/2003 | Torii et al. | |
| 2004/0028539 A1 | | 2/2004 | Williams et al. | |
| 2010/0194219 A1 | | 8/2010 | Hotta et al. | |

FOREIGN PATENT DOCUMENTS

| | | | | |
|---|---|---|---|---|
| EP | 1418660 | | 5/2004 | |
| JP | 64-37364 U | | 3/1989 | |
| JP | 64037364 U | | 3/1989 | |
| JP | 05103443 A | * | 4/1993 | ............ H02K 9/02 |
| JP | 09-046972 | | 2/1997 | |
| JP | 2003-111492 | | 4/2003 | |
| JP | 2004-003472 | | 1/2004 | |
| JP | 2006-197781 | | 7/2006 | |
| WO | WO 2008-153169 | | 12/2008 | |

OTHER PUBLICATIONS

Extended European Search Report for corresponding EP Application No. 11150480.9-2207, Jun. 1, 2011.
Japanese Office Action for corresponding JP Application No. 2010-005413, Jun. 6, 2013.

* cited by examiner

*Primary Examiner* — Tran Nguyen
(74) *Attorney, Agent, or Firm* — Ditthavong Mori & Steiner, P.C.

(57) ABSTRACT

This disclosure discloses a motor comprising: a motor main body; and a winding switching unit configured to switch windings of the motor main body; the motor main body including: a motor housing that a first coolant channel is formed inside; and a stator having the windings and fixed to an inner surface of the motor housing, the winding switching unit including: a winding switching housing that a second coolant channel is formed inside and being disposed on an outer surface of the motor housing, and heat-generating components disposed at an outer surface of the winding switching housing and used to switch the windings.

10 Claims, 12 Drawing Sheets

MOTOR AND VEHICLE

CROSS-REFERENCE TO RELATED APPLICATION

The present application claims priority from Japanese Patent Application No. 2010-005413, which was filed on Jan. 14, 2010, the disclosure of which is incorporated herein by reference in its entirety.

BACKGROUND OF THE INVENTION

1. Field of the Invention

The present invention relates to a motor and a vehicle having the motor.

2. Description of the Related Art

A prior art that has a structure for a motor comprising a motor main body and a winding switching unit configured to switch windings of the motor main body, is known. In the prior art, the winding switching unit is disposed on an outer peripheral surface of the motor main body (refer to, for example, JP, U, 64-37364).

SUMMARY OF THE INVENTION

According to the first aspect of the present invention, there is provided a motor comprising: a motor main body; and a winding switching unit configured to switch windings of the motor main body; the motor main body including: a motor housing that a first coolant channel is formed inside; and a stator having the windings and fixed to an inner surface of the motor housing, the winding switching unit including: a winding switching housing that a second coolant channel is formed inside and being disposed on an outer surface of the motor housing, and heat-generating components disposed at an outer surface of the winding switching housing and used to switch the windings.

According to the second aspect of the present invention, there is provided a motor comprising: a motor main body having windings and a first coolant channel for cooling the windings; and a winding switching unit being disposed on an outer surface of the motor main body and having heat-generating components used to switch the windings and having a second coolant channel for cooling the heat-generating components.

According to the third aspect of the present invention, there is provided a vehicle comprising: a motor; a driving device; and a cooling device, the motor having: a motor main body including windings and a first coolant channel for cooling the windings; and a winding switching unit being disposed on an outer surface of the motor main body and including heat-generating components used to switch the windings and including a second coolant channel for cooling the heat-generating components; the driving device that a third coolant channel is formed and is configured to control the switching of the winding switching unit and to apply driving voltage to the windings, and the cooling device cooling coolant that flows through the first to third coolant channels.

DETAILED DESCRIPTION OF THE EMBODIMENTS

The following describes embodiments of the present invention with reference to accompanying drawings.

Embodiment 1

Figure 1:
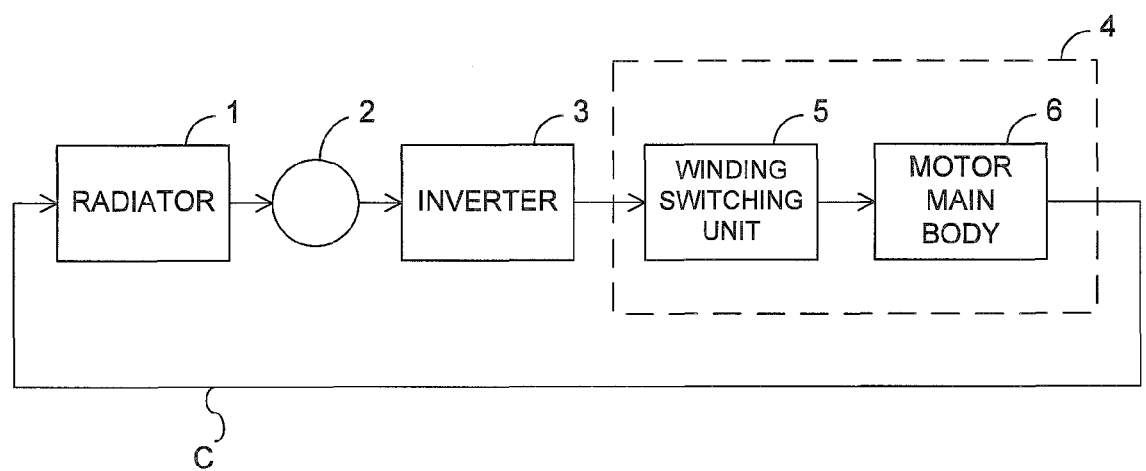
FIG. 1 is a diagram illustrating an example of a cooling system according to embodiment 1 of the present invention.

First, an example of a cooling system according to embodiment 1 of the present invention will be described with reference to FIG. 1. FIG. 1 is a diagram illustrating an example of a cooling system according to embodiment 1 of the present invention.

In FIG. 1, a cooling system is mounted in a vehicle, and comprises a radiator 1, a pump 2, an inverter 3, and a motor 4. The motor 4 comprises a winding switching unit 5 and a motor main body 6. The motor main body 6 comprises windings and a first coolant channel for cooling the windings. The winding switching unit 5 comprises heat-generating components, including a semiconductor switching element used to switch the windings of the motor main body 6, such as a bipolar transistor or IGBT, and a second coolant channel for cooling the heat-generating components. The winding switching unit 5 is disposed on an outer surface of the motor main body 6 and the outer surface located at a side opposite to a load side (here-in-after, described as "anti-load side") of the motor main body 6. The inverter 3 is a driving device that comprises a third coolant channel. The inverter 3 controls the switching of the winding switching unit 5 in accordance with the driven state of the motor 4, and applies a driving voltage to the windings of the motor main body 6. The employed circuit configuration of the windings of the motor main body 6, the employed circuit configuration of the winding switching unit 5, and the employed control method of the inverter 3 are, for example, those disclosed in JP, A, 2003-111492, and detailed descriptions thereof will be omitted. The radiator 1 is a cooling device that cools a coolant C, such as water. The pump 2 is a device that applies pressure to the coolant C and circulates the coolant C within the cooling system.

In FIG. 1, the coolant C cooled in the radiator 1 flows through the third coolant channel of the inverter 3 via the pump 2, cooling heat-generating components of the inverter 3. After flowing through the third coolant channel, the coolant C flows through the second coolant channel of the winding switching unit 5 and cools heat-generating components. After flowing through the second coolant channel, the coolant C flows through the first coolant channel of the motor main body 6 and cools the windings. After flowing through the first coolant channel, the coolant C flows into the radiator 1 once again, and then is cooled by the radiator 1. The coolant C cooled by the radiator 1 flows through the third coolant channel of the inverter 3 via the pump 2 once again. The coolant C is thus circulated within the cooling system via such a route, cooling the heat-generating components and the windings.

Figure 2:
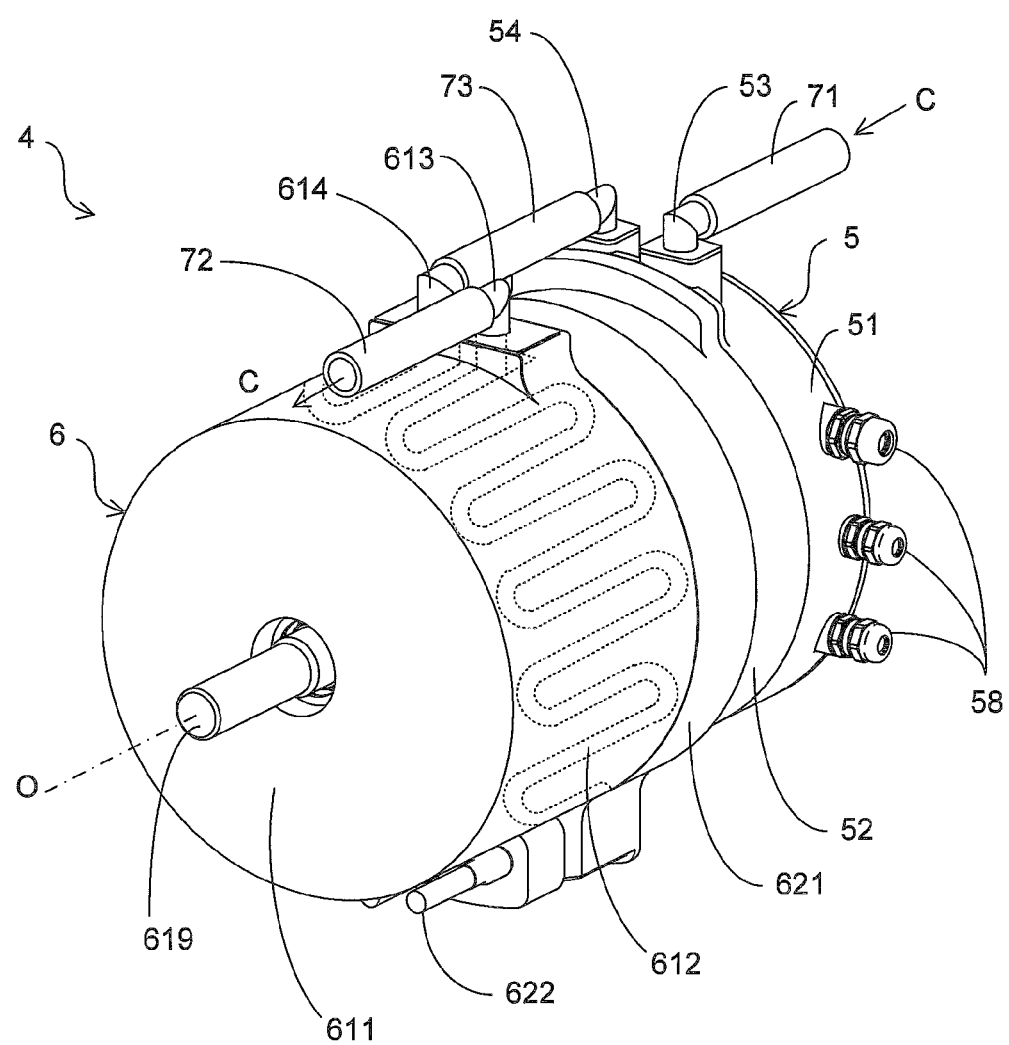
FIG. 2 is a perspective view of the motor according to embodiment 1 of the present invention.
Figure 3:
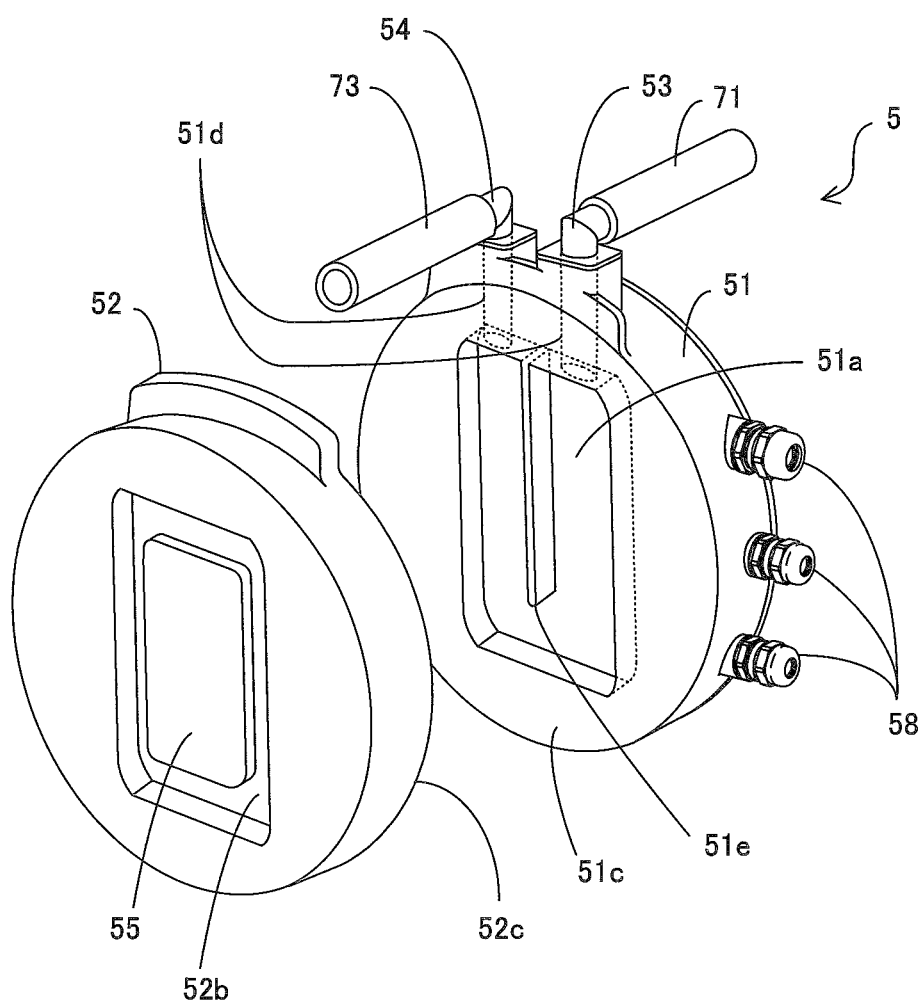
FIG. 3 is an exploded perspective view of the winding switching unit 5 of the motor according to embodiment 1 of the present invention.
Figure 4:
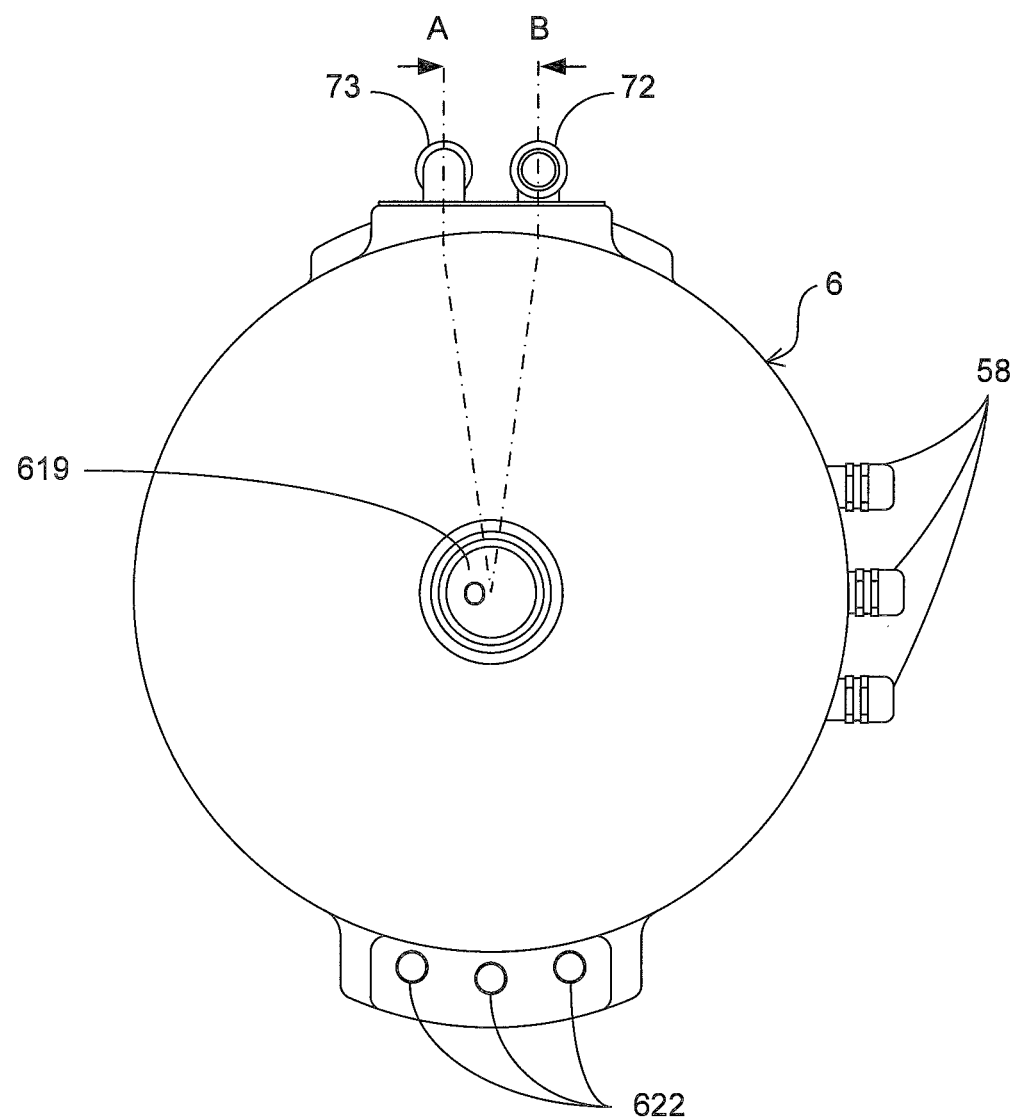
FIG. 4 is a front view of the motor according to embodiment 1 of the present invention.
Figure 5:
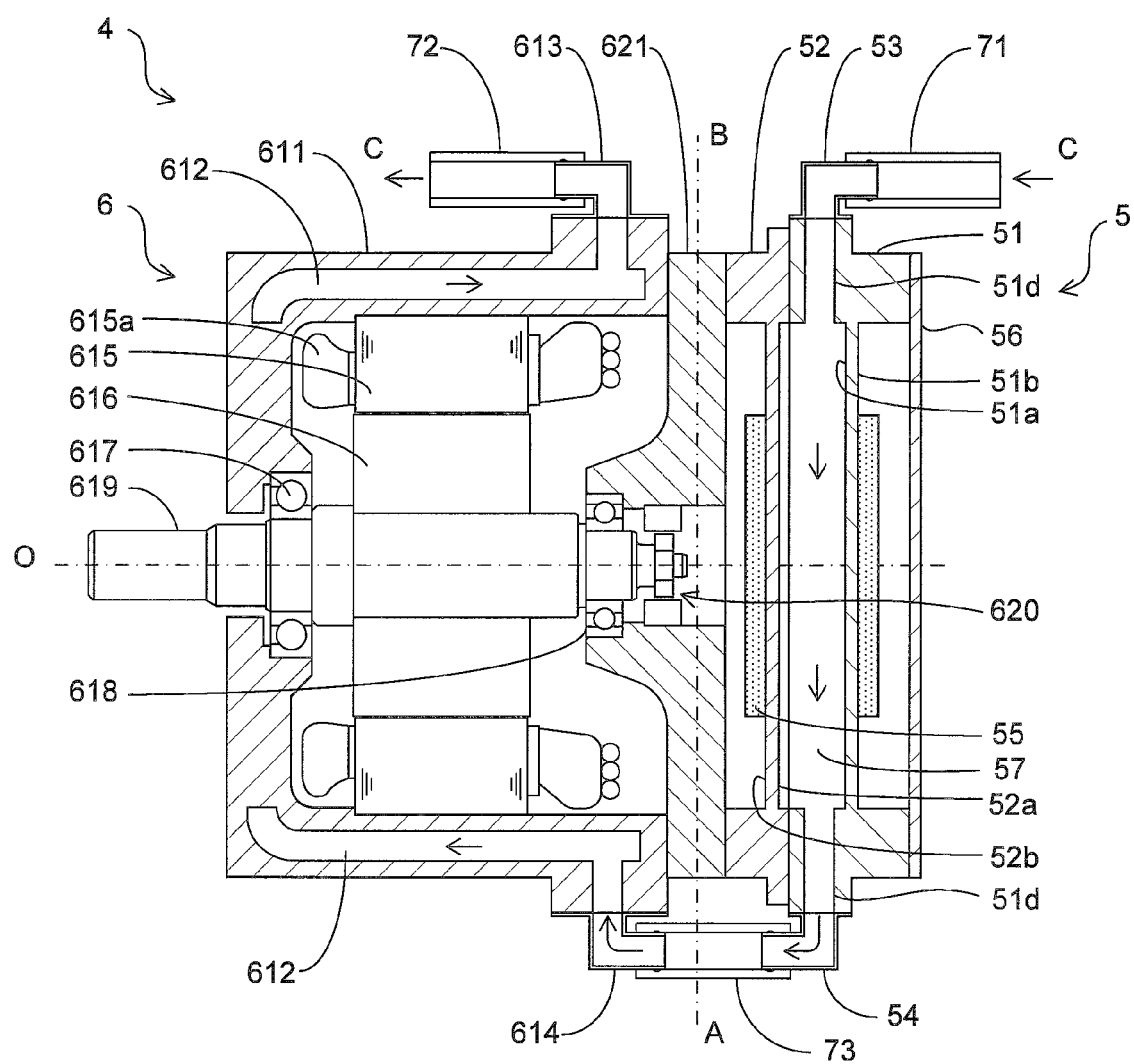
FIG. 5 is a cross-sectional view of the motor according to embodiment 1 of the present invention.

Next, the specific configuration of the motor 4 according to this embodiment will be described with reference to FIG. 2 to FIG. 5. FIG. 2 is a perspective view of the motor 4 according to this embodiment. Reference number O in FIG. 2 denotes the axis of rotation of a shaft 619. FIG. 3 is an exploded perspective view of the winding switching unit 5 of the motor 4 according to this embodiment. FIG. 4 is a front view of the motor 4 according to this embodiment. FIG. 5 is a cross-sectional view of the motor 4 according to this embodiment, cut along line AOB and viewed from the direction of the arrow in FIG. 4.

In FIG. 2 to FIG. 5, the motor 4 comprises the motor main body 6 and the winding switching unit 5. The motor main body 6 comprises a frame 611, piping members 613 and 614, a stator 615, a rotor 616, bearings 617 and 618, the shaft 619, a resolver 620, a bracket 621, and a motor cable 622.

The frame 611 is substantially cylindrical in shape, with the open end on the load side closed. The bracket 621 is disposed on the anti-load side of the frame 611. The frame 611 and the bracket 621 constitute a motor housing. A first coolant channel 612 is formed in the interior of the frame 611. As illustrated in FIG. 2, the first coolant channel 612 is formed in a zigzag shape across the outer periphery of the frame 611. As illustrated in FIG. 2 and FIG. 5, one end and the other end of the first coolant channel 612 are disposed on the outer surface of the frame 611 and the outer surface faces an exterior of the motor 4. The piping member 613 is provided on one end of the first coolant channel 612 and the piping member 614 is provided on the other end of the first coolant channel 612. A hose 72 connected with the radiator 1 shown in FIG. 1 is provided on the piping member 613. A hose 73 connected with a second coolant channel 57 of the winding switching unit 5 described later is provided on the piping member 614.

The stator 615 comprises windings 615a having the circuit configuration disclosed in JP, A, 2003-111492, for example. The windings 615a is provided on a stator core of the stator 615. The stator 615 is fixed to the inner surface of the frame 611. The rotor 616 is substantially cylindrical in shape. The outer periphery of the rotor 616 is surrounded by the stator 615, and the inner periphery of the rotor 616 is provided on the outer periphery of the shaft 619. The rotor 616 rotates by a magnetic field produced by the windings 615a. The shaft 619 is rotatably supported by the bearings 617 and 618 with respect to the frame 611 and the bracket 621. The resolver 620 is disposed on the anti-load side of the shaft 619. The motor cable 622 is provided in a quantity of three as illustrated in FIG. 2 and FIG. 4, each with one end connected with the windings 615a and the other end connected with the inverter 3 shown in FIG. 1.

In FIG. 2 to FIG. 5, the winding switching unit 5 is disposed on an outer surface of the motor main body 6 and the outer surface is located on the anti-load side of the motor main body 6. The winding switching unit 5 comprises a first housing member 51 as the second outer surface, a second housing member 52 as the first outer surface, piping members 53 and 54, a heat-generating components 55, a cover 56, and a signal wire terminal 58.

The second housing member 52 is provided on the anti-load side of the bracket 621. The first housing member 51 is provided on the anti-load side of the second housing member 52. The first housing member 51 and the second housing member 52 constitute the winding switching housing. As illustrated in FIG. 3, a first inner surface concave portion 51a is formed on a surface 51c on the load side of the first housing member 51. Holes 51d that extend to the piping members 53 and 54 are formed on an inner wall of the first inner surface concave portion 51a. Although not shown in FIG. 3, a second inner surface concave portion 52a having the same shape as the first inner surface concave portion 51a is formed on a surface 52c on the anti-load side of the second housing member 52 as well. The first inner surface concave portion 51a, the holes 51d, and the second inner surface concave portion 52a form the second coolant channel 57 in the interior of the winding switching housing wherein the first housing member 51 and the second housing member 52 come together, as shown in FIG. 5. Note that, in FIG. 5, the cross-section of a wall 51e shown in FIG. 3 and a cross-section of a wall on the side of the second housing member 52 corresponding to the wall 51e are omitted for ease of explanation. As illustrated in FIG. 3 and FIG. 5, one end and the other end of the second coolant channel 57 are disposed on the outer surface of the first housing member 51 and the outer surface faces an exterior of the motor 4. The piping member 53 is provided on one end of the second coolant channel 57 and the piping member 54 is provided on the other end of the second coolant channel 57. A hose 71 that connects with the third coolant channel of the inverter 3 shown in FIG. 1 is provided on the piping member 53. The hose 73 connected with the other end of the first coolant channel 612 of the motor main body 6 is provided on the piping member 54.

As illustrated in FIG. 3 and FIG. 5, a first outer surface concave portion 51b is formed on a surface on the anti-load side of the first housing member 51, and a second outer surface concave portion 52b is formed on a surface on the load side of the second housing member 52. The heat-generating components 55, which is a semiconductor switch element used for switching the windings 615a, such as a bipolar transistor, IGBT, etc., is in close contact with the first outer surface concave portion 51b and the second outer surface concave portion 52b. The cover 56 that covers the first outer surface concave portion 51b is provided on a surface on the anti-load side of the first housing member 51. The signal wire terminal 58 for inputting a control signal from the inverter 3 is provided on the first housing member 51.

Next, the flow of the coolant C within the motor 4 configured as described above will be described with reference to FIG. 5. After flowing through the third coolant channel of the inverter 3, the coolant C flows through the second coolant channel 57 of the winding switching unit 5 via the hose 71 and the piping member 53. With this arrangement, the heat-generating components 55 are cooled, further suppressing the ambient temperature within the winding switching unit 5. After flowing through the second coolant channel 57, the coolant C flows through the first coolant channel 612 of the motor main body 6 via the piping member 54, the hose 73, and the piping member 614. With this arrangement, the windings 615a are cooled via the frame 611. After flowing through the first coolant channel 612, the coolant C flows out to the radiator 1 via the piping member 613 and the hose 72.

In general, in a motor comprising the motor main body and the winding switching unit as described above, the motor main body and the winding switching unit both generate heat. Therefore, the motor main body and the winding switching unit are preferably cooled in a highly efficient manner. Nevertheless, in the prior art, the motor main body and the winding switching unit are merely naturally cooled by natural air cooling, and not cooled with high efficiency.

As described above, in this embodiment, the motor main body 6 and the winding switching unit 5 are cooled by the coolant C. As a result, it is possible to cool the motor main body 6 and the winding switching unit 5 more efficiently than prior art.

Additionally, in this embodiment, the winding switching unit 5 is disposed on the outer face located on the anti-load side of the motor main body 6. The load side of the motor main body 6 is often installed to the chassis, etc., of a vehicle. Thus, by providing the winding switching unit 5 on the outer face located on the anti-load side of the motor main body 6, the cover 56 can be easily opened to maintain and inspect the winding switching unit 5.

Additionally, according to this embodiment, the coolant C flows through the second coolant channel 57 of the winding switching unit 5 and then through the first coolant channel 612 of the motor main body 6. Generally, the maximum temperature of the windings 615a of the motor main body 6 is higher than the maximum temperature of the heat-generating components 55 of the winding switching unit 5. Thus, with the coolant C flowing first through the second coolant channel 57, the temperature rise of the coolant C is further suppressed than a case where the coolant C flows first through the first coolant channel 612. As a result, it is possible to cool the heat-generating components 55 of the winding switching unit 5 more efficiently.

Note that while the winding switching unit 5 is disposed at the outer surface on the anti-load side of the motor main body 6 in the above, the present invention is not limited thereto. That is, the winding switching unit 5 may be disposed at the outer surface on the load side of the motor main body 6 or at the outer peripheral surface of the motor main body 6.

Additionally, while the motor housing comprises the frame 611 and the bracket 621 in the above, the present invention is not limited thereto. For example, the motor housing may be a housing wherein the frame 611 and the bracket 621 are integrated. Additionally, the frame 611 may be substantially cylindrical in shape, with the load side open, and a load side bracket may be further provided on the load side of the frame 611. Then, the motor housing may comprise this load side bracket, the frame 611, and the bracket 621.

Additionally, while the coolant C flows through the second coolant channel 57 of the winding switching unit 5 and then through the first coolant channel 612 of the motor main body 6 in the above, the present invention is not limited thereto. In a case where the motor main body 6 is used within a range in which the temperature of the windings 615a does not increase beyond the temperature of the heat-generating components of the winding switching unit 5, the coolant C may first flow through the first coolant channel 612. With this arrangement, it is possible to cool the windings 615a of the motor main body 6 more efficiently.

Embodiment 2

Figure 6:
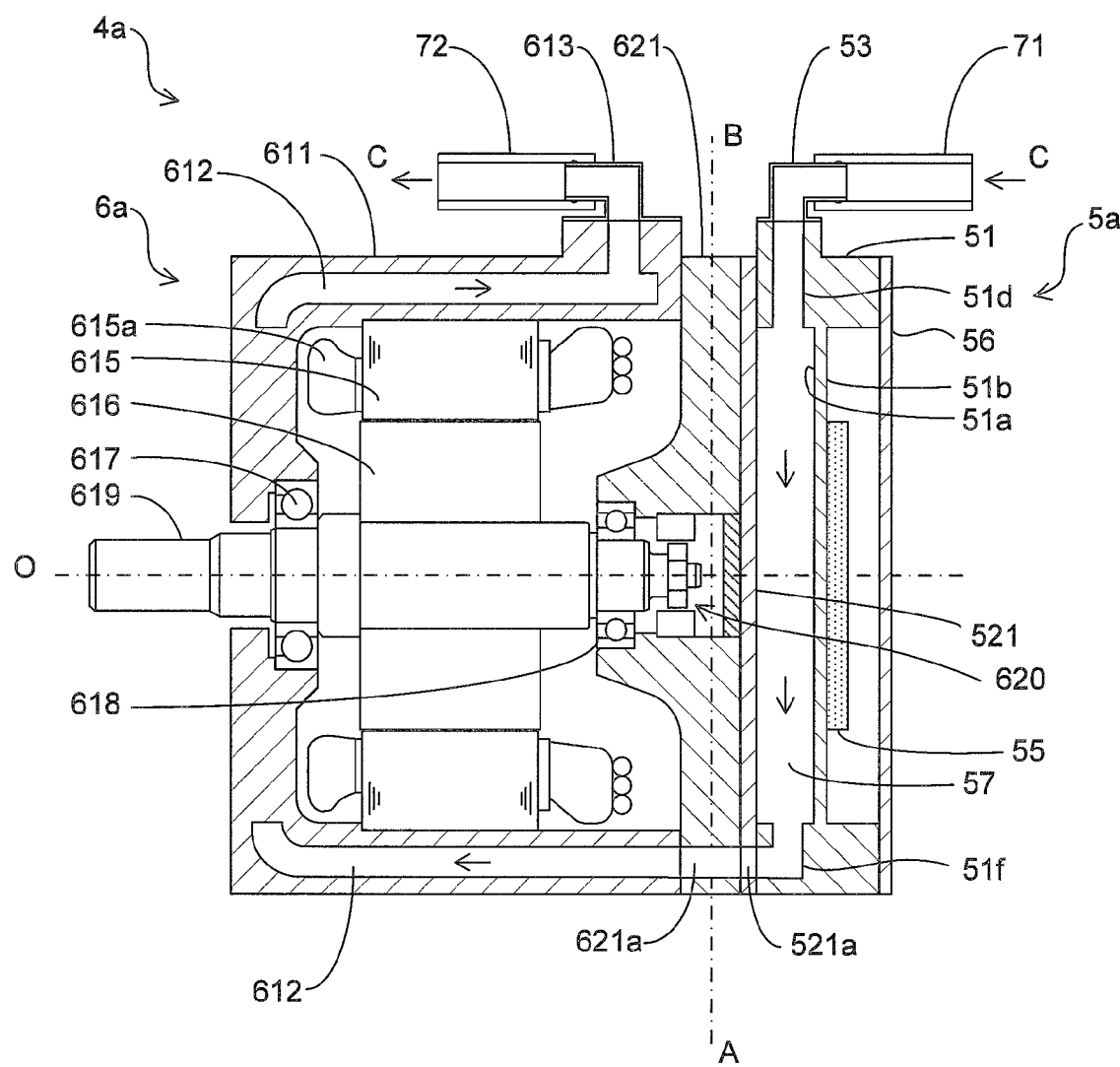
FIG. 6 is a cross-sectional view of the motor according to embodiment 2 of the present invention.

The configuration of the motor according to embodiment 2 of the present invention will now be described with reference to FIG. 6. FIG. 6 is a cross-sectional view of the motor according to embodiment 2 of the present invention. Reference number O in FIG. 6 denotes the axis of rotation of the shaft 619. In FIG. 6, the components identical to those in embodiment 1 shown in FIG. 5 are denoted using the same reference numerals as those in FIG. 5. The cooling system according to this embodiment is the same as the cooling system according to embodiment 1 shown in FIG. 1, and descriptions thereof will be omitted. The motor according to this embodiment differs from the motor 4 according to embodiment 1 in that the heat-generating components 55 and all other components of the winding switching unit 5 are provided only on the side opposite the motor main body 6 from the second coolant channel 57, and the other end of the second coolant channel 57 of the winding switching unit 5 is directly joined to the other end of the first coolant channel 612 of the motor main body 6. The description that follows will focus on these differences.

In FIG. 6, a motor 4a according to this embodiment comprises a winding switching unit 5a and a motor main body 6a. The motor main body 6a comprises the frame 611, the piping member 613, the stator 615, the rotor 616, the bearings 617 and 618, the shaft 619, the resolver 620, the bracket 621, and the motor cable 622.

A hole 621a is formed on the bracket 621. The hole 621a constitutes a part of the first coolant channel 612 formed in the interior of the frame 611. One end of the first coolant channel 612 is disposed on the outer surface of the frame 611 and the outer surface faces the exterior of the motor 4a. The piping member 613 is provided on one end of the first coolant channel 612, and the hose 72 connected with the radiator 1 shown in FIG. 1 is provided on the piping member 613. The other end of the first coolant channel 612 is disposed on a contact part of the bracket 621 and the contact part is in contact with the winding switching unit 5a. The other end of the first coolant channel 612 is directly coupled with the other end of the second coolant channel 57 of the winding switching unit 5a described later.

In FIG. 6, the winding switching unit 5a is provided on the outer surface of the motor main body 6a and the outer surface is located on the anti-load side of the motor main body 6a. The winding switching unit 5a comprises the first housing member 51, a second housing member 521, the piping member 53, the heat-generating components 55, the cover 56, and the signal wire terminal 58.

The second housing member 521 is a sheet-shaped member having a hole 521a, and is provided on the anti-load side of the bracket 621. The first housing member 51 is provided on the anti-load side of the second housing member 521. The first housing member 51 and the second housing member 521 constitute the winding switching housing. The first inner surface concave portion 51a is formed on a side located at the load side of the first housing member 51. The hole 51d that extends to the piping member 53 and a hole 51f that extends to the hole 521a of second housing member 521 are formed on the inner wall of the first inner surface concave portion 51a. The first inner surface concave portion 51a, the hole 51d, the hole 51f, and the hole 521a form the second coolant channel 57 in the interior of the winding switching housing that is formed by combining the first housing member 51 and the second housing member 521. One end of the second coolant channel 57 is disposed on the outer surface of the first housing member 51 and the outer surface faces the exterior of the motor 4a. The piping member 53 is provided on one end of the second coolant channel 57, and the hose 71 connected with the third coolant channel of the inverter 3 shown in FIG. 1 is provided on the piping member 53. The other end of the second coolant channel 57 is disposed on a contact part of the second housing member 521 and the contact part is in contact with the bracket 621 of the motor main body 6. The other end of the second coolant channel 57 is directly coupled with the other end of the first coolant channel 612 of the motor main body 6a. The heat-generating components 55 and all other components of the winding switching unit 5a are in close contact with the first outer surface concave portion 51b of the first housing member 51.

Next, the flow of the coolant C within the motor 4a configured as described above will be described with reference to FIG. 6. After flowing through the third coolant channel of the inverter 3, the coolant C flows through the second coolant channel 57 of the winding switching unit 5a via the hose 71 and the piping member 53. With this arrangement, the heat-generating components 55 is cooled, further suppressing the ambient temperature within the winding switching unit 5a. After flowing through the second coolant channel 57, the coolant C flows through the first coolant channel 612 of the motor main body 6 without passing through a hose or piping member. With this arrangement, the windings 615a are cooled via the frame 611. After flowing through the first coolant channel 612, the coolant C flows out to the radiator 1 via the piping member 613 and the hose 72.

As described above, in this embodiment, the heat-generating components 55 and all other components of the winding switching unit 5a are provided on the side opposite the motor main body 6a from the second coolant channel 57. As a result, the heat transmitted from the motor main body 6a to the components of the winding switching unit 5a is blocked by the second coolant channel 57, making it possible to alleviate the effect of the heat from the motor main body 6a. The effect is received by the components of the winding switching unit 5a. Furthermore, such a design further simplifies the structure of the second housing member 521 than the structure of the second housing member 52 of embodiment 1, making it possible to reduce the size of the winding switching unit 5a.

Further, in this embodiment, the other end of the second coolant channel 57 of the winding switching unit 5a is directly coupled with the other end of the first coolant channel 612 of the motor main body 6. As a result, the piping members 614 and 54 and the hose 73 shown in embodiment 1 can be eliminated, making it possible achieve reductions in price and weight.

Note that while in the above both a structure wherein the heat-generating components 55 and all other components of the winding switching unit 5a are provided on the side opposite the motor main body 6a from the second coolant channel 57, and a structure wherein the other end of the second coolant channel 57 of the winding switching unit 5a is directly coupled with the other end of the first coolant channel 612 of the motor main body 6a are applied, either one of these structures may be applied alone.

Embodiment 3

Figure 7:
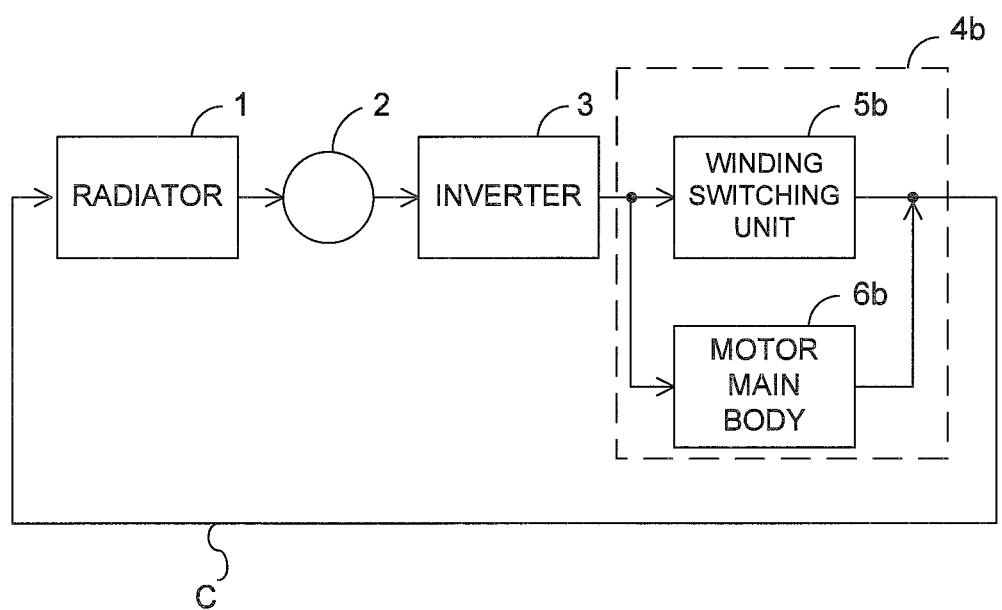
FIG. 7 is a diagram illustrating an example of a cooling system according to embodiment 3 of the present invention.

An example of a cooling system according to embodiment 3 of the present invention will now be described with reference to FIG. 7. FIG. 7 is a diagram illustrating an example of a cooling system according to embodiment 3 of the present invention. In FIG. 7, the components identical to those in embodiment 1 shown in FIG. 1 are denoted using the same reference numerals as those in FIG. 1. The cooling system according to this embodiment differs from the cooling system according to embodiment 1 in that the coolant C flows in parallel to the winding switching unit 5 and the motor main body 6. The description that follows will focus on this difference.

In FIG. 7, the cooling system is mounted in a vehicle, and comprises the radiator 1, the pump 2, the inventor 3, and a motor 4b. The motor 4b comprises a winding switching unit 5b and a motor main body 6b. The motor main body 6b comprises windings and a first coolant channel for cooling the windings. The winding switching unit 5b comprises heat-generating components used for switching the windings of the motor main body 6b, and a second coolant channel for cooling the heat-generating components. The winding switching unit 5b is disposed at the outer surface of the motor main body 6b and the outer surface is located on the anti-load side surface of the motor main body 6b. The employed circuit configuration of the windings of the motor main body 6b, the employed circuit configuration of the winding switching unit 5b, and the employed control method of the inverter 3 are, for example, those disclosed in JP, A, 2003-111492, and detailed descriptions thereof will be omitted.

In FIG. 7, the coolant C cooled in the radiator 1 flows through the third coolant channel of the inverter 3 via the pump 2, cooling the heat-generating components of the inverter 3. After flowing through the third coolant channel, the coolant C flows in parallel through the second coolant channel of the winding switching unit 5b and the first coolant channel of the motor main body 6b, respectively cooling the heat-generating components of the winding switching unit 5b and the windings of the motor main body 6b. After flowing through the first coolant channel and the second coolant channel, the coolant C flows into the radiator 1 once again, where it is cooled by the radiator 1. The coolant C cooled by the radiator 1 flows through the third coolant channel of the inverter 3 via the pump 2 once again. The coolant C is thus circulated within the cooling system via such a route, cooling the heat-generating components and the windings.

Figure 8:
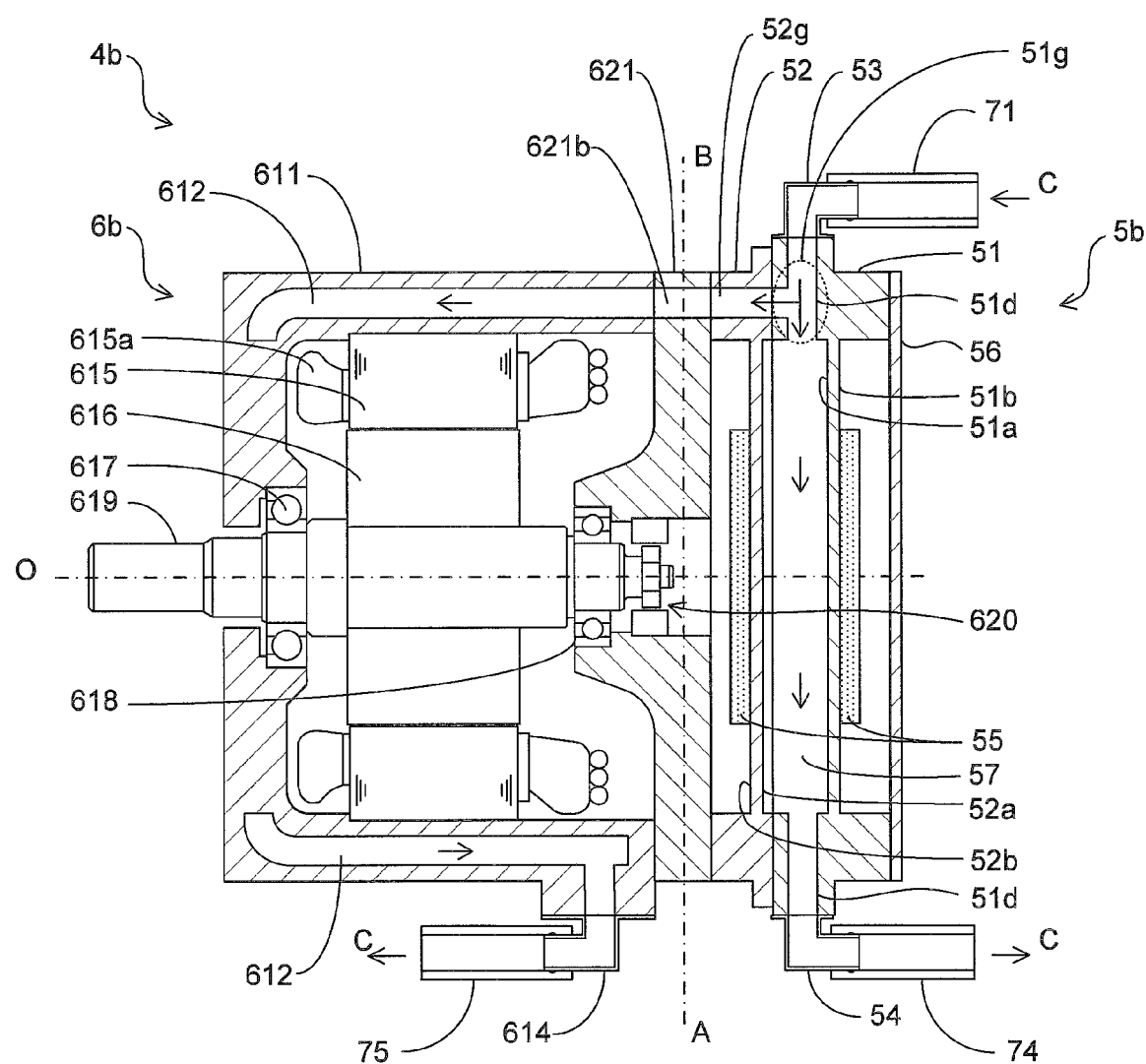
FIG. 8 is a cross-sectional view of the motor according to embodiment 3 of the present invention.

Next, the specific configuration of the motor 4b according to this embodiment will be described with reference to FIG. 8. FIG. 8 is a cross-sectional view of the motor 4b according to this embodiment. Reference number O in FIG. 8 denotes the axis of rotation of the shaft 619. In FIG. 8, the components identical to those in embodiment 1 shown in FIG. 5 are denoted using the same reference numerals as those in FIG. 5. The motor 4b according to this embodiment differs from the motor 4 according to embodiment 1 in that the second coolant channel 57 branches off inside the winding switching unit 5, and the branched second coolant channel 57 is coupled with the first coolant channel 612 of the motor main body 6. The description that follows will focus on these differences.

In FIG. 8, the motor main body 6b comprises the frame 611, the piping member 614, the stator 615, the rotor 616, the bearings 617 and 618, the shaft 619, the resolver 620, the bracket 621, and the motor cable 622.

A hole 621b is formed on the bracket 621. The hole 621b makes up a part of the first coolant channel 612 formed in the interior of the frame 611. One end of the first coolant channel 612 is disposed on a contact part of the bracket 621 and the contact part is in contact with the winding switching unit 5b. The one end of the first coolant channel 612 is directly coupled with the branched end of the second coolant channel 57 of the winding switching unit 5b described later. The other end of the first coolant channel 612 is disposed on the outer surface of the frame 611 and the outer surface faces the exterior of the motor 4b. The piping member 614 is provided on the other end of the first coolant channel 612, and a hose 75 connected with the radiator 1 shown in FIG. 7 is provided on the piping member 614.

In FIG. 8, the winding switching unit 5b is disposed on the outer surface of the motor main body 6b and the outer surface is located on the anti-load side of the motor main body 6b. The winding switching unit 5b comprises the first housing member 51, the second housing member 52, the piping members 53 and 54, the heat-generating components 55, the cover 56, and the signal wire terminal 58.

A hole 52g that joins one end of the first coolant channel 612 of the motor main body 6b is formed on the second housing member 52. Holes 51d that extend to the piping members 53 and 54 are formed on an inner wall of the first inner surface concave portion 51a. Furthermore, a branch portion 51g is formed at the hole 51d that extends to the piping member 53. The branched end that branches from the hole 51d by the branch portion 51g is coupled with the hole 52g of the second housing member 52. The first inner surface concave portion 51a, the hole 51d, the hole 52g, and the second inner surface concave portion 52a form the second coolant channel 57 that is branched by the branch portion 51g in the interior of the winding switching housing that is formed by combining the first housing member 51 and the second housing member 52. A first end as one end of the second coolant channel 57 and a second end as the other end of the second coolant channel 57 are disposed on the outer surface of the first housing member 51 and the outer surface faces the exterior of the motor 4b. The piping member 53 is provided on the first end of the second coolant channel 57, and the piping member 54 is provided on the second end of the second coolant channel 57. The hose 71 that connects with the third coolant channel of the inverter 3 shown in FIG. 7 is provided on the piping member 53. A hose 74 connected with the radiator 1 shown in FIG. 7 is provided on the piping member 54. A third end of the second coolant channel 57 as a branched end that is branched by the branch portion 51g, is disposed at a contact part of the second housing member 52 and the contact part is in contact with the bracket 621. The third end of the second coolant channel 57 is connected with one end of the first coolant channel 612.

Next, the flow of the coolant C within the motor 4b configured as described above will be described with reference to FIG. 8. After flowing through the third coolant channel of the inverter 3, the coolant C simultaneously flows through the second coolant channel 57 of the winding switching unit 5b via the hose 71 and the piping member 53, and flows through the first coolant channel 612 of the motor main body 6b. With this arrangement, the heat-generating components 55 of the winding switching unit 5b and the windings 615a of the motor main body 6b are cooled. After flowing through the second coolant channel 57, the coolant C flows out to the radiator 1 via the piping member 54 and the hose 74. After flowing through the first coolant channel 612, the coolant C flows out to the radiator 1 via the piping member 614 and the hose 75.

As described above, in this embodiment, the coolant C flows in parallel to the winding switching unit 5b and the motor main body 6b. As a result, the rise in temperature of the coolant C caused by the winding switching unit 5b does not affect the motor main body 6b, nor does the rise in temperature of the coolant C caused by the motor main body 6b affect the winding switching unit 5b, as was the case in embodiment 1. As a result, it is possible to cool the motor main body 6b and the winding switching unit 5b more efficiently.

Further, according to this embodiment, the second coolant channel 57 is branched off in the interior of the winding switching unit 5b, and the branched second coolant channel 57 and the first coolant channel 612 of the motor main body 6b are joined together. As a result, the piping member 613 shown in embodiment 1 can be eliminated, making it possible achieve reductions in price and weight.

Note that while in the above the coolant C flows into the hose 71 and flows out from the hoses 74 and 75, the present invention is not limited thereto. The coolant C may flow into the hoses 74 and 75 and flows out from the hose 71. In such a case, the hoses 74 and 75 are connected with the third coolant channel of the inverter 3 shown in FIG. 7, and the hose 71 is connected with the radiator 1.

Further, while in the above the heat-generating components 55 of the winding switching unit 5b is provided on the first outer surface concave portion 51b and the second outer surface concave portion 52b in the same manner as embodiment 1, the present invention is not limited thereto. As in embodiment 2, a structure wherein the heat-generating components 55 and all other components of the winding switching unit 5b are provided on only the side opposite the motor main body 6b from the second coolant channel 57 (on only the first outer surface concave portion 51b) may be applied to the motor 4b of this embodiment.

Embodiment 4

Figure 9:
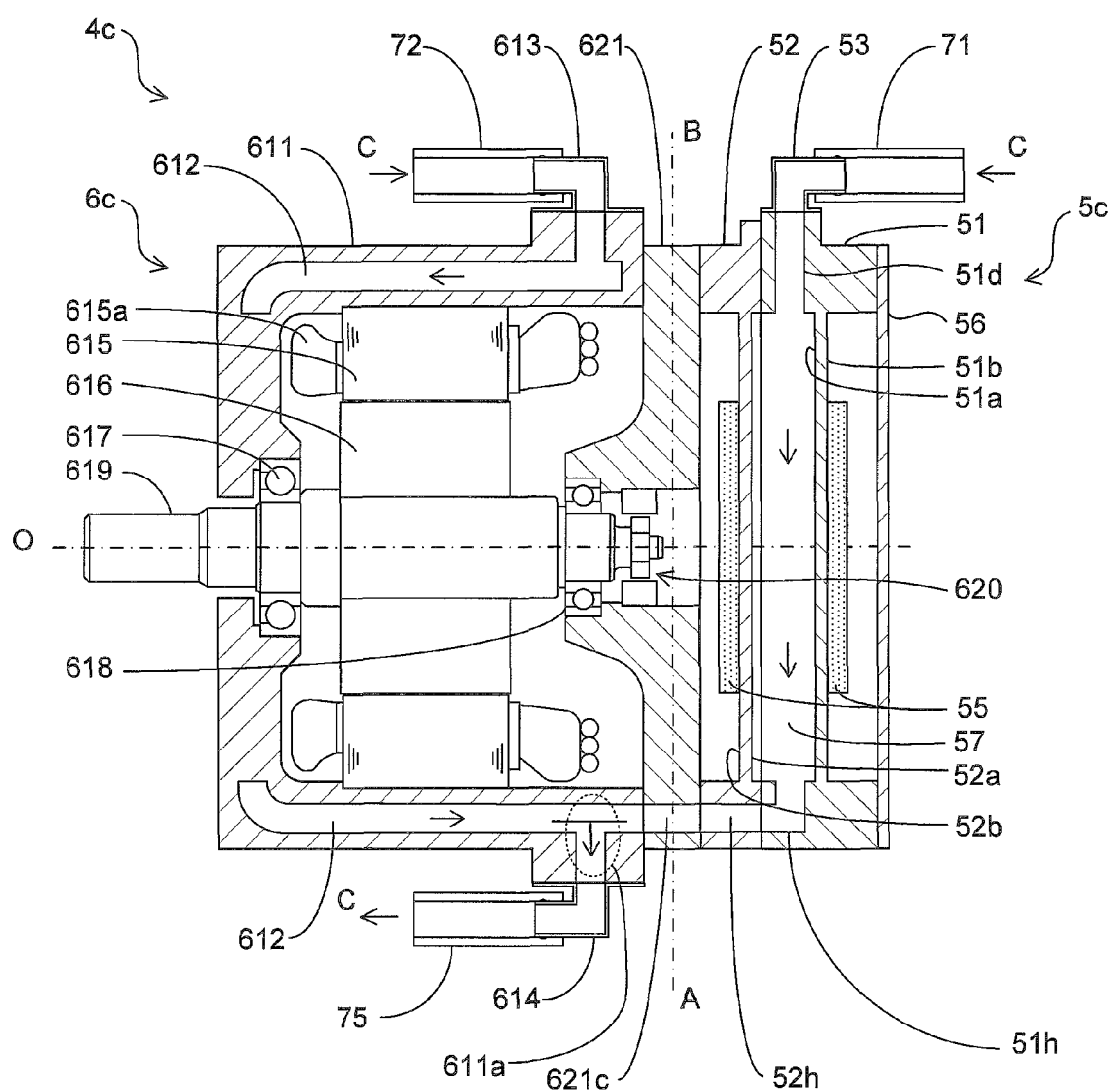
FIG. 9 is a cross-sectional view of the motor according to embodiment 4 of the present invention.

The configuration of the motor according to embodiment 4 of the present invention will now be described with reference to FIG. 9. FIG. 9 is a cross-sectional view of the motor according to embodiment 4. Reference number O in FIG. 9 denotes the axis of rotation of the shaft 619. In FIG. 9, the components identical to those in embodiment 1 shown in FIG. 1 are denoted using the same reference numerals as those in FIG. 1. In the cooling system according to this embodiment, the coolant C flows in parallel to the winding switching unit and the motor main body similar to the cooling system according to embodiment 3 shown in FIG. 7, and descriptions thereof will be omitted. The motor according to this embodiment differs from the motor 4 according to embodiment 1 in that the first coolant channel 612 branches off in the interior of the motor main body 6, and the branched first coolant channel 612 and the second coolant channel 57 of the winding switching unit 5 are joined together. The description that follows will focus on these differences.

In FIG. 9, a motor 4c comprises a winding switching unit 5c and a motor main body 6c. The motor main body 6c comprises the frame 611, the piping members 613 and 614, the stator 615, the rotor 616, the bearings 617 and 618, the shaft 619, the resolver 620, the bracket 621, and the motor cable 622.

A first end as one end of the first coolant channel 612 and a second end as the other end of the first coolant channel 612 are provided on the outer surface of the frame 611 and the outer surface faces the exterior of the motor 4c. The piping member 613 is provided on the first end of the first coolant channel 612, and the hose 72 connected with the third coolant channel of the inverter 3 shown in FIG. 7 is provided on the piping member 613. The piping member 614 is provided on the second end of the first coolant channel 612, and the hose 75 connected with the radiator 1 shown in FIG. 7 is provided on the piping member 614. A branch portion 611a is formed in the interior of the frame 611 in the first coolant channel 612. The branched end that is branched by the branch portion 611a is coupled with a hole 621c formed on the bracket 621. The hole 621c is a part of the first coolant channel 612, and a third end as branched end of the first coolant channel 612 branched by the branch portion 611a is disposed on at a contact part of the bracket 621 and the contact part is in contact with the second housing member 52.

In FIG. 9, the winding switching unit 5c is disposed on the outer surface of the motor main body 6c and the outer surface is located on the anti-load side of the motor main body 6c, and comprises the first housing member 51, the second housing member 52, the piping member 53, the heat-generating components 55, the cover 56, and the signal wire terminal 58.

A hole 52*h* that is coupled with the third end of the first coolant channel 612 of the motor main body 6*c* is formed on the second housing member 52. The hole 51*d* that extends to the piping member 53 and a hole 51*h* that extends to the hole 52*h* of the second housing member 52 are formed on the inner wall of the first inner surface concave portion 51*a*. The first inner surface concave portion 51*a*, the hole 51*d*, the hole 51*h*, the hole 52*h*, and the second inner surface concave portion 52*a* form the second coolant channel 57 in the interior of the winding switching housing that is formed by combining the first housing member 51 and the second housing member 52. One end of the second coolant channel 57 is disposed on the outer surface of the first housing member 51 and the outer surface faces the exterior of the motor 4*c*. The piping member 53 is provided on one end of the second coolant channel 57, and the hose 71 connected with the third coolant channel of the inverter 3 shown in FIG. 7 is provided on the piping member 53. The other end of the second coolant channel 57 is disposed at a contacting part of the second housing member 52 and the contacting part is in contact with the bracket 621. The other end of the second coolant channel 57 is coupled with the third end of the first coolant channel 612.

Next, the flow of the coolant C within the motor 4*c* configured as described above will be described with reference to FIG. 9. After flowing through the third coolant channel of the inverter 3, the coolant C simultaneously flows through the second coolant channel 57 of the winding switching unit 5*c* via the hose 71 and the piping member 53, and flows through the first coolant channel 612 of the motor main body 6*c* via the hose 72 and the piping member 613. With this arrangement, the heat-generating components 55 of the winding switching unit 5*c* and the windings 615*a* of the motor main body 6*c* are cooled. The coolant C flowed through the second coolant channel 57 and the coolant C flowed through the first coolant channel 612 flow out to the radiator 1 via the piping member 614 and the hose 75.

As described above, in this embodiment, the coolant C flows in parallel to the winding switching unit 5*c* and the motor main body 6*c*. As a result, the rise in temperature of the coolant C caused by the winding switching unit 5*c* does not affect the motor main body 6*c*, nor does the rise in temperature of the coolant C caused by the motor main body 6*c* affect the winding switching unit 5*c*, as was the case in embodiment 1. As a result, it is possible to cool the motor main body 6*c* and the winding switching unit 5*c* more efficiently.

Further, in this embodiment, the first coolant channel 612 is branched in the interior of the motor main body 6*c*, and the branched first coolant channel 612 and the second coolant channel 57 of the winding switching unit 5*c* are joined together. As a result, the piping member 54 shown in embodiment 1 can be eliminated, making it possible achieve reductions in price and weight.

Note that while in the above the coolant C flows into the hose 71 and the hose 72 and flows out from the hose 75, the present invention is not limited thereto. The coolant C may flow into the hose 75 and flows out from the hose 71 and the hose 72. In such a case, the hose 75 is connected with the third coolant channel of the inverter 3 shown in FIG. 7, and the hoses 71 and 72 are connected with the radiator 1.

Further, while in the above the heat-generating components 55 of the winding switching unit 5*c* is provided on the first outer surface concave portion 51*b* and the second outer surface concave portion 52*b* similar to embodiment 1, the present invention is not limited thereto. As in embodiment 2, a structure wherein the heat-generating components 55 and all other components of the winding switching unit 5*c* are provided on only the side opposite the motor main body 6*c* from the second coolant channel 57 (on only the first outer surface concave portion 51*b*) may be applied to the motor 4*c* of this embodiment.

Embodiment 5

Figure 10:
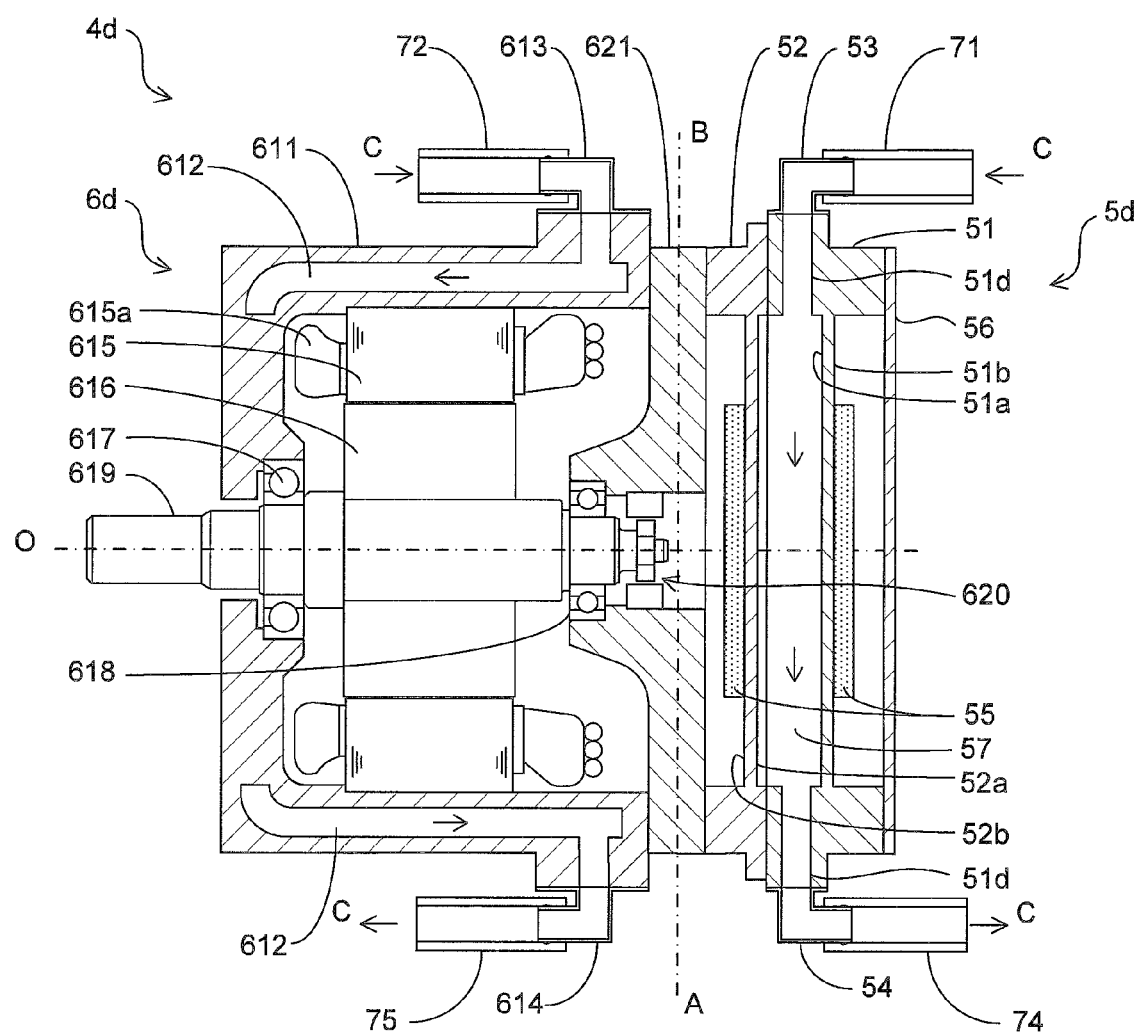
FIG. 10 is a cross-sectional view of the motor according to embodiment 5 of the present invention.

The configuration of the motor according to embodiment 5 of the present invention will now be described with reference to FIG. 10. FIG. 10 is a cross-sectional view of the motor according to embodiment 5. Reference number O in FIG. 10 denotes the axis of rotation of the shaft 619. In FIG. 10, the components identical to those in embodiment 1 shown in FIG. 1 are denoted using the same reference numerals as those in FIG. 1. In the cooling system according to this embodiment, the coolant C flows in parallel to the winding switching unit and the motor main body similar to the cooling system according to embodiment 3 shown in FIG. 7, and descriptions thereof will be omitted. The motor according to this embodiment differs from the motor 4 according to embodiment 1 in that the other end of the first coolant channel 612 of the motor main body 6 and the other end of the second coolant channel 57 of the winding switching unit 5 are not joined together. The description that follows will focus on this difference.

In FIG. 10, a motor 4*d* comprises a winding switching unit 5*d* and a motor main body 6*d*. The motor main body 6*d* comprises the frame 611, the piping members 613 and 614, the stator 615, the rotor 616, the bearings 617 and 618, the shaft 619, the resolver 620, the bracket 621, and the motor cable 622.

One end and the other end of the first coolant channel 612 are disposed on the outer surface of the frame 611 and the outer surface faces the exterior of the motor 4*d*. The piping member 613 is provided on one end and the piping member 614 is provided on the other end of the first coolant channel 612. The hose 72 connected with the third coolant channel of the inverter 3 shown in FIG. 7 is provided on the piping member 613, and the hose 75 connected with the radiator 1 shown in FIG. 7 is provided on the piping member 614.

In FIG. 10, the winding switching unit 5*d* is disposed on the outer surface of the motor main body 6*d* and the outer surface is located at the anti-load side of the motor main body 6*d*. The winding switching unit 5*d* comprises the first housing member 51, the second housing member 52, the piping members 53 and 54, the heat-generating components 55, the cover 56, and the signal wire terminal 58.

The one end and the other end of the second coolant channel 57 are disposed on the outer surface of the first housing member 51 and the outer surface faces exterior of the motor 4*d*. The piping member 53 is provided on one end of the second coolant channel 57 and the piping member 54 is provided on the other end of the second coolant channel 57. The hose 71 connected with the third coolant channel of the inverter 3 shown in FIG. 7 is provided on the piping member 53, and the hose 74 connected with the radiator 1 shown in FIG. 7 is provided on the piping member 54.

Next, the flow of the coolant C in the motor 4*d* configured as described above will be described with reference to FIG. 10. After flowing through the third coolant channel of the inverter 3, the coolant C simultaneously flows through the second coolant channel 57 of the winding switching unit 5*d* via the hose 71 and the piping member 53, and flows through the first coolant channel 612 of the motor main body 6*d* via the hose 72 and the piping member 613. With this arrangement, the heat-generating components 55 of the winding switching unit 5*d* and the windings 615*a* of the motor main body 6*d* are cooled. After flowing through the second coolant channel 57, the coolant C flows out to the radiator 1 via the piping member 54 and the hose 74. After flowing through the first coolant channel 612, the coolant C flows out to the radiator 1 via the piping member 614 and the hose 75.

As described above, in this embodiment, the coolant C flows in parallel to the winding switching unit 5d and the motor main body 6d. As a result, the rise in temperature of the coolant C caused by the winding switching unit 5d does not affect the motor main body 6d, nor does the rise in temperature of the coolant C caused by the motor main body 6d affect the winding switching unit 5d, as was the case in embodiment 1. As a result, it is possible to cool the motor main body 6d and the winding switching unit 5d more efficiently.

Note that while in the above the coolant C flows into the hose 71 and the hose 72 and flows out from the hoses 74 and 75, the present invention is not limited thereto. The coolant C may flow into the hoses 74 and 75 and flows out from the hose 71 and the hose 72. In such a case, the hoses 74 and 75 are connected with the third coolant channel of the inverter 3 shown in FIG. 7, and the hoses 71 and 72 are connected with the radiator 1.

Further, while in the above the heat-generating components 55 of the winding switching unit 5d is provided on the first outer surface concave portion 51b and the second outer surface concave portion 52b similar to embodiment 1, the present invention is not limited thereto. As in embodiment 2, a structure wherein the heat-generating components 55 and all other components of the winding switching unit 5d are provided on only the side opposite the motor main body 6d from the second coolant channel 57 (on only the first outer surface concave portion 51b) may be applied to the motor 4d of this embodiment.

Embodiment 6

Figure 11:
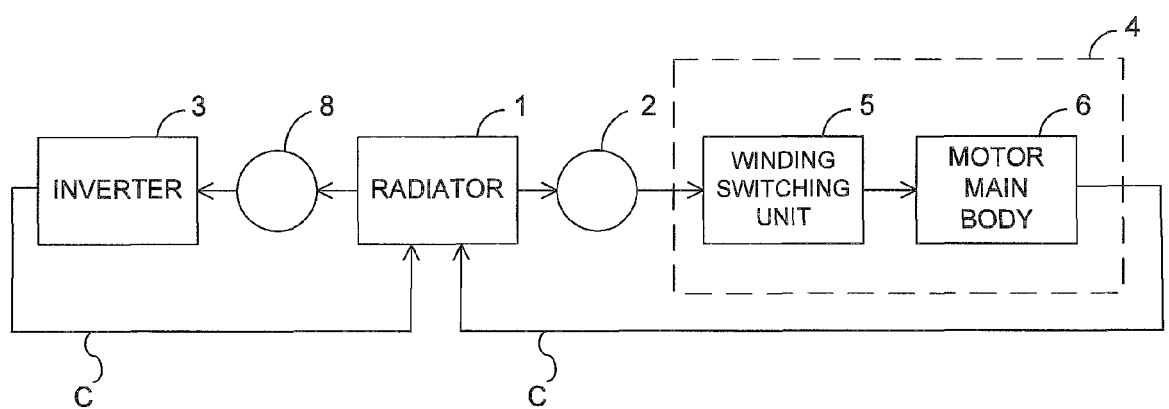
FIG. 11 is a diagram illustrating an example of a cooling system according to embodiment 6 of the present invention.

An example of a cooling system according to embodiment 6 of the present invention will now be described with reference to FIG. 11. FIG. 11 is a diagram illustrating an example of a cooling system according to embodiment 6 of the present invention. In FIG. 11, the components identical to those in embodiment 1 shown in FIG. 1 are denoted using the same reference numerals as those in FIG. 1. The cooling system according to the embodiment differs from the cooling system according to embodiment 1 in that the coolant C that flows to the inverter 3 and the coolant C that flows to the motor 4 are separately cooled by the radiator 1. The description that follows will focus on this difference.

In FIG. 11, a cooling system is mounted in a vehicle, and comprises the radiator 1, the pumps 2 and 8, the inventor 3, and the motor 4. The motor 4 is a motor according to embodiment 1, for example, and comprises the winding switching unit 5 and the motor main body 6.

In FIG. 11, a portion of the coolant C cooled by the radiator 1 flows through the second coolant channel of the winding switching unit 5 and through the first coolant channel of the motor main body 6 via the pump 2, cooling the heat-generating components of the winding switching unit 5 and the windings of the motor main body 6, respectively. After flowing through the first coolant channel and the second coolant channel, the coolant C flows into the radiator 1 once again, where it is cooled by the radiator 1. A part of the coolant C cooled by the radiator 1 flows through the second coolant channel of the winding switching unit 5 and the first coolant channel of the motor main body 6 via the pump 2 once again. The other part of the coolant C cooled by the radiator 1 flows through the third coolant channel of the inverter 3 via a pump 8, cooling the heat-generating components of the inverter 3.

After flowing through the third coolant channel, the coolant C flows into the radiator 1 once again, where it is cooled by the radiator 1. The other portion of the coolant C cooled by the radiator 1 flows through the third coolant channel of the inverter 3 via the pump 8 once again. The coolant C is thus circulated within the cooling system via such a route, cooling the heat-generating components and the windings.

As described above, in this embodiment, the coolant C that flows to the inverter 3 and the coolant C that flows to the motor 4 are separately cooled by the radiator 1. As a result, the cooling process is completed without the rise in temperature of the coolant C caused by the inverter 3 affecting the coolant C that flows to the winding switching unit 5 and the motor main body 6. As a result, it is possible to cool the winding switching unit 5 and the motor main body 6 more efficiently.

Figure 12:
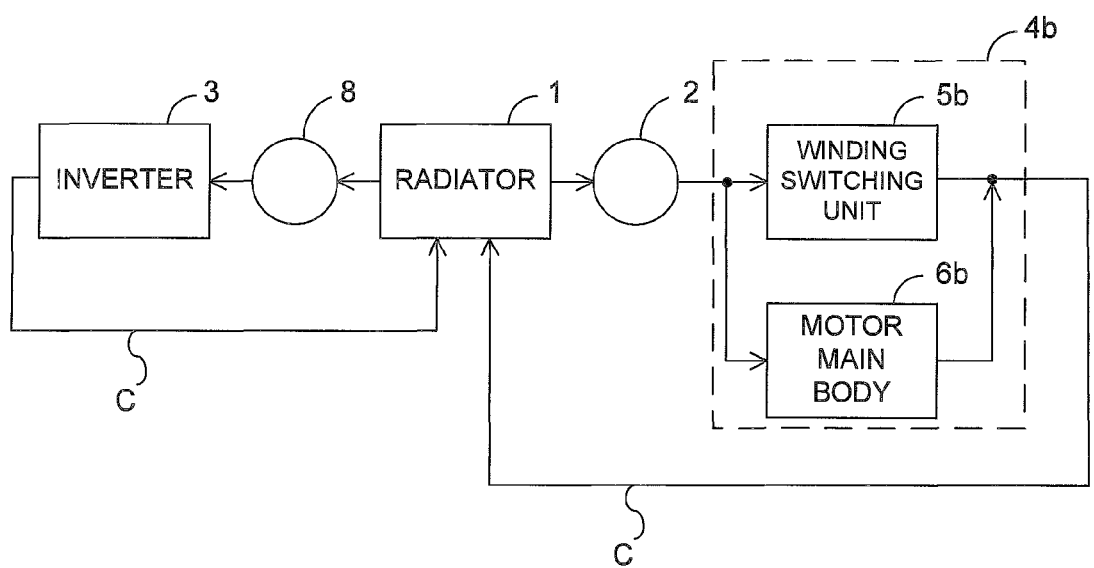
FIG. 12 is a diagram illustrating another example of a cooling system according to embodiment 6 of the present invention.

Note that while the above has described an illustrative scenario in which the motor 4 according to embodiment 1 is employed as the motor, i.e., the first coolant channel 612 and the second coolant channel 57 are serially connected, the present invention is not limited thereto. As shown in FIG. 12, a case where the first coolant channel 612 and the second coolant channel 57 are connected in parallel, such as with the motor 4b according to embodiment 3, is acceptable. FIG. 12 is a diagram illustrating another example of a cooling system according to embodiment 6.

In the foregoing specification, the invention has been described with reference to specific embodiments. However, one of ordinary skill in the art appreciates that various modifications and changes can be made without departing from the scope of the invention as set forth in the claims. Accordingly, all such modifications are intended to be included within the scope of the invention.

What is claimed is:

1. A motor comprising:
   a motor main body; and
   a winding switching unit configured to switch windings of said motor main body;
   said motor main body including:
   a motor housing that a first coolant channel is formed inside; and
   a stator having said windings and fixed to an inner surface of said motor housing,
   said winding switching unit including:
   a winding switching housing that a second coolant channel is formed inside and being disposed on an outer surface of said motor housing; and
   heat-generating components disposed at an outer surface of said winding switching housing and used to switch said windings, wherein:
   one end of said first coolant channel is disposed on an outer surface of said motor housing, the outer surface facing an exterior of said motor;
   one end of said second coolant channel is disposed on an outer surface of said winding switching housing, the outer surface facing an exterior of said motor; and
   the other end of said first coolant channel and the other end of said second coolant channel are connected to each other.

2. The motor according to claim 1, wherein:
   said winding switching housing has:
   a first outer surface disposed in the motor housing side from said second coolant channel; and
   a second outer surface disposed opposite to the motor housing side from said second coolant channel; and
   said heat-generating components are respectively provided on said first outer surface and said second outer surface.

3. The motor according to claim 1, wherein:
said winding switching unit further includes components other than said heat-generating components; and
said heat-generating components and all of the other components are disposed on an outer surface located opposite to the motor housing side from said second coolant channel.

4. The motor according to claim 1, wherein:
the other end of said first coolant channel is disposed on a contact part of said motor housing, the contact part being in contact with said winding switching housing; and
the other end of said second coolant channel is disposed on a contact part of said winding switching housing, the contact part being in contact with said motor housing and coupled with the other end of said first coolant channel.

5. The motor according to claim 1, wherein:
a coolant flows into one end of said second coolant channel and flows out from one end of said first coolant channel.

6. The motor according to claim 1, wherein:
a coolant flows into one end of said first coolant channel and flows out from one end of said second coolant channel.

7. A motor comprising:
a motor main body; and
a winding switching unit configured to switch windings of said motor main body;
said motor main body including:
  a motor housing that a first coolant channel is formed inside; and
  a stator having said windings and fixed to an inner surface of said motor housing,
said winding switching unit including:
  a winding switching housing that a second coolant channel is formed inside and being disposed on an outer surface of said motor housing; and
  heat-generating components disposed at an outer surface of said winding switching housing and used to switch said windings, wherein:
said second coolant channel branches off in the interior of said winding switching housing,
a first end and a second end of said second coolant channel are disposed on an outer surface of said winding switching housing, the outer surface facing an exterior of said motor;
a third end of said second coolant channel is disposed on a contact part of said winding switching housing, the contact part being in contact with said motor housing;
one end of said first coolant channel is disposed on a contact part of said motor housing, the contact part being in contact with said winding switching housing and coupled with said third end of said second coolant channel; and
the other end of said first coolant channel is disposed on an outer surface of said motor housing, the outer surface facing an exterior of said motor.

8. A motor comprising:
a motor main body; and
a winding switching unit configured to switch windings of said motor main body;
said motor main body including:
  a motor housing that a first coolant channel is formed inside; and
  a stator having said windings and fixed to an inner surface of said motor housing,
said winding switching unit including:
  a winding switching housing that a second coolant channel is formed inside and being disposed on an outer surface of said motor housing; and
  heat-generating components disposed at an outer surface of said winding switching housing and used to switch said windings, wherein:
said first coolant channel branches off in the interior of said motor housing;
a first end and a second end of said first coolant channel are disposed on an outer surface of said motor housing, the outer surface facing an exterior of said motor;
a third end of said first coolant channel is disposed on a contact part of said motor housing, the contact part being in contact with said winding switching housing;
one end of said second coolant channel is disposed on an outer surface of said winding switching housing, the outer surface facing an exterior of said motor; and
the other end of said second coolant channel is disposed on a contact part of said winding switching housing, the contact part being in contact with said motor housing and is coupled with said third end of said first coolant channel.

9. A motor comprising:
a motor main body; and
a winding switching unit configured to switch windings of said motor main body;
said motor main body including:
  a motor housing that a first coolant channel is formed inside; and
  a stator having said windings and fixed to an inner surface of said motor housing,
said winding switching unit including:
  a winding switching housing that a second coolant channel is formed inside and being disposed on an outer surface of said motor housing; and
  heat-generating components disposed at an outer surface of said winding switching housing and used to switch said windings, wherein:
one end and the other end of said first coolant channel are disposed on an outer surface of said motor housing, the outer surface facing an exterior of said motor; and
one end and the other end of said second coolant channel are disposed on an outer surface of said winding switching housing, the outer surface facing an exterior of said motor.

10. The motor according to claim 1, wherein:
said winding switching housing is disposed on an outer surface of said motor housing, the outer surface being located opposite to a load side.

* * * * *